(12) United States Patent
Jones-Morton et al.

(10) Patent No.: US 7,831,460 B1
(45) Date of Patent: Nov. 9, 2010

(54) EXPATRIATE ASSOCIATE SELECTION PROCESS

(75) Inventors: Pamela Jones-Morton, Dublin, OH (US); Cheryl Layman, Delaware, OH (US); Charles E. Richardson, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1476 days.

(21) Appl. No.: 10/772,200

(22) Filed: Feb. 4, 2004

Related U.S. Application Data (63) Continuation-in-part of application No. 10/113,342, filed on Mar. 29, 2002, now abandoned.

(51) Int. Cl.
*G06Q 10/00* (2006.01)

(52) U.S. Cl. .................. 705/9; 705/4; 717/100

(58) Field of Classification Search ........ 705/9
See application file for complete search history.

(56) References Cited

U.S. PATENT DOCUMENTS

| | | | | |
|---|---|---|---|---|
| 6,049,776 | A | 4/2000 | Donnelly et al. | 705/8 |
| 6,289,340 | B1* | 9/2001 | Puram et al. | 707/5 |
| 2001/0034630 | A1* | 10/2001 | Mayer et al. | 705/7 |
| 2003/0083921 | A1 | 5/2003 | Clark et al. | 705/8 |
| 2003/0106039 | A1* | 6/2003 | Rosnow et al. | 717/100 |
| 2003/0229529 | A1 | 12/2003 | Mui et al. | 705/8 |
| 2004/0064329 | A1* | 4/2004 | Broad et al. | 705/1 |

OTHER PUBLICATIONS

Harvey, The Selection of Managers for Foreign Assignments: A Planning Perspective, The Columbia Journal of World Business, Winter 1996, p. 102-12.*

Poe, Selection savvy: HR should invest in the selection process for expatriate assignments to prevent costly failures down the road—Global HR—human resources, HR Magazine, Apr. 2002, p. 1-4.*

China HR Manager of the Year, China Staff, Oct. 2003, vol. 9, No. 10, p. 23 (online reprint p. 1-3).*

Lainsbury, Once Upon an American Dream—The Story of Eurodisneyland, University Press of Kansas, 2000, 308 pp., p. 93-102, 213-15.*

Grant, Euro Disney: From Dream to Nightmare, 1987-94, 2002, p. 1-23.*

(Continued)

*Primary Examiner*—Beth V Boswell
*Assistant Examiner*—Justin M Pats
(74) *Attorney, Agent, or Firm*—Standley Law Group LLP (57) ABSTRACT

The present invention is an expatriate associate selection process that uses standardized motivational, behavioral, cultural, and technical assessments as the basis for the selection process. Associates who may be appropriate candidates for international assignments are identified. Each associate is asked to complete assessments that are used to evaluate skills, abilities, and motivations. The results are analyzed and tabulated so that results among candidates may be compared. At various points in the process, associates may voluntarily withdraw or the company may decide to remove the associates from further consideration. Associates may be given additional training to address any gaps that were identified during the assessments. Timing requirements may be analyzed so that the selection process starts well in advance of proposed assignments. The process allows the company to create and maintain an expatriate group comprising candidates who are prepared to fulfill international assignments as they are identified.

12 Claims, 4 Drawing Sheets

OTHER PUBLICATIONS

Afterthemouse.com, A history of Disneyland Paris resort—The Disney resort that nearly closed, Oct. 22, 2009, p. 1-6.*

Koepp, Do You Believe in Magic? Starring in its own Cinderella story, Disney transforms itself, Time Magazine, Apr. 25, 1988, p. 66 (online reprint p. 1-8).*

Tempest, Challenging casting call for Disney, Los Angeles Times, Nov. 8, 1991, A5, col. 1 (online reprint p. 1-2).*

Anthony, Euro Disney: The First 100 Days, Harvard Business School, Jun. 4, 1993, p. 1-21.*

A Disney Dress Code Chafes in the Land of Haute Couture, The New York Times, Sec. 1, p. 1, col. 5, Dec. 25, 1991 (Online Reprint p. 1-4).*

Frazee, Selecting Global Assignees, Workforce, vol. 77, No. 7, 1998, p. S28 (online reprint p. 1-5).*

* cited by examiner

EXPATRIATE ASSOCIATE SELECTION PROCESS

CROSS REFERENCE TO RELATED APPLICATION

This application is a continuation-in-part of pending U.S. application Ser. No. 10/113,342, filed Mar. 29, 2002 entitled "INTEGRATED HUMAN RESOURCE MANAGEMENT SYSTEM," which is expressly incorporated herein by reference.

FIELD OF THE INVENTION

The present invention relates generally to systems and methods for human resource management. Specifically, the present invention relates to a method for selecting associates for expatriate assignments.

BACKGROUND OF THE INVENTION

Many multinational companies today post large numbers of managers and professionals in assignments outside their home countries. Recent surveys indicate that the number of expatriates will increase over the next two years. Although the costs of sending associates outside their home countries is high, multinational companies continue to post associates in expatriate assignments in order to position themselves for greater global competition.

As important and costly as expatriates can be, few multinational companies take a well-organized approach to their selection, briefing, and eventual repatriation. Many companies do not have a structured procedure for selecting associates for international assignments. Instead, selection of associates for expatriate assignments is conducted by each department of the company using different techniques and criteria. The individual processes do not lend themselves to efficient or effective means for selection nor do they allow for comparison between departments of consistent variables on which to cross-reference candidates. For example, some departments may consider technical knowledge to be the most important selection criteria while other departments may consider time in position, long-term development, or intercultural capabilities to be more important. Even if the individual departments have established selection criteria, they may not use any form of assessment to screen candidates. Finally, they may not provide expatriates with any form of cultural briefing or provide assistance to the expatriates' families, if applicable.

The failure to use a structured procedure for expatriate associate selection often results in the selection of associates who are not well-suited for the assignments. Some associates may not adapt well to cultural differences. Even if an associate is able to adapt to the cultural differences, the associate's family, if applicable, may experience difficulties that affect the associate's work while on the assignment. If the assignment is successful but the associate is not repatriated or reintegrated appropriately, the company does not obtain the full benefit of the associate's experience. In many instances, the associate simply leaves the company shortly after the assignment. If the associate chooses to stay with the company, the failed assignment can have serious implications for the remainder of the associate's career and may compromise the associate's position in the company. The failure also impacts the company if the goals and objectives of the assignment are not met. Therefore, there is a need for a structured procedure for expatriate associate selection that results in the selection of associates who are well-suited for the assignment and able to meet the company's goals and objectives for the assignment.

SUMMARY OF THE INVENTION

The present invention relates to processes for screening and selecting associates. The present invention is an expatriate associate selection process that uses standardized motivational, behavioral, cultural, and technical assessments as the basis for the selection process. The structured approach to expatriate associate selection provided by the present invention assists a department in selecting candidates that are likely to be successful in their assignments outside their home countries.

First, the department identifies associates who may be appropriate candidates for international assignments. Then, each associate is asked to complete various assessments that are used to evaluate the associate's skills and personality traits in several areas. Some of the assessments are self-assessments. Finally, the results of the assessments are analyzed and tabulated so that a department looking to fill one or more international assignments may compare the results for a plurality of candidates. At various points in the process, associates may voluntarily withdraw or the department may decide to place the associates in a selection pool for further consideration or to remove associates from further consideration. Finally, associates may be given additional training to address any gaps that were identified during the assessments.

Timing requirements may be analyzed so that the associate selection process starts well in advance of proposed assignments. As a result, the process allows the company to create and maintain an "expatriate pool" or group comprising candidates who are prepared to fulfill international assignments as they are identified. As the company's needs for international assignments change, the company always has associates who are ready to fill the assignments.

DESCRIPTION OF EXAMPLE EMBODIMENTS

Figure 1A:
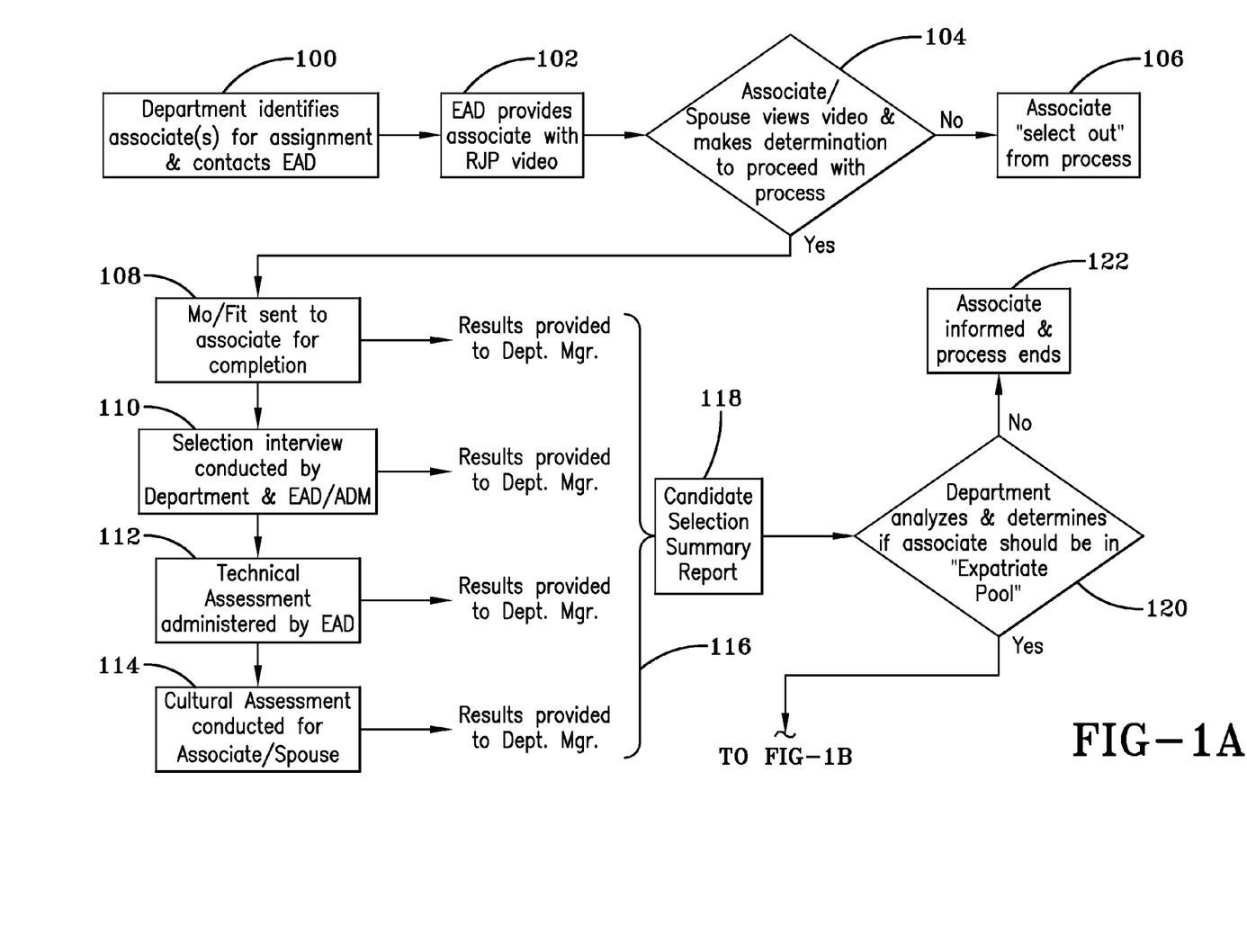
FIG. 1 is a flowchart for an expatriate associate selection process according to an example embodiment of the present invention.
Figure 1B:
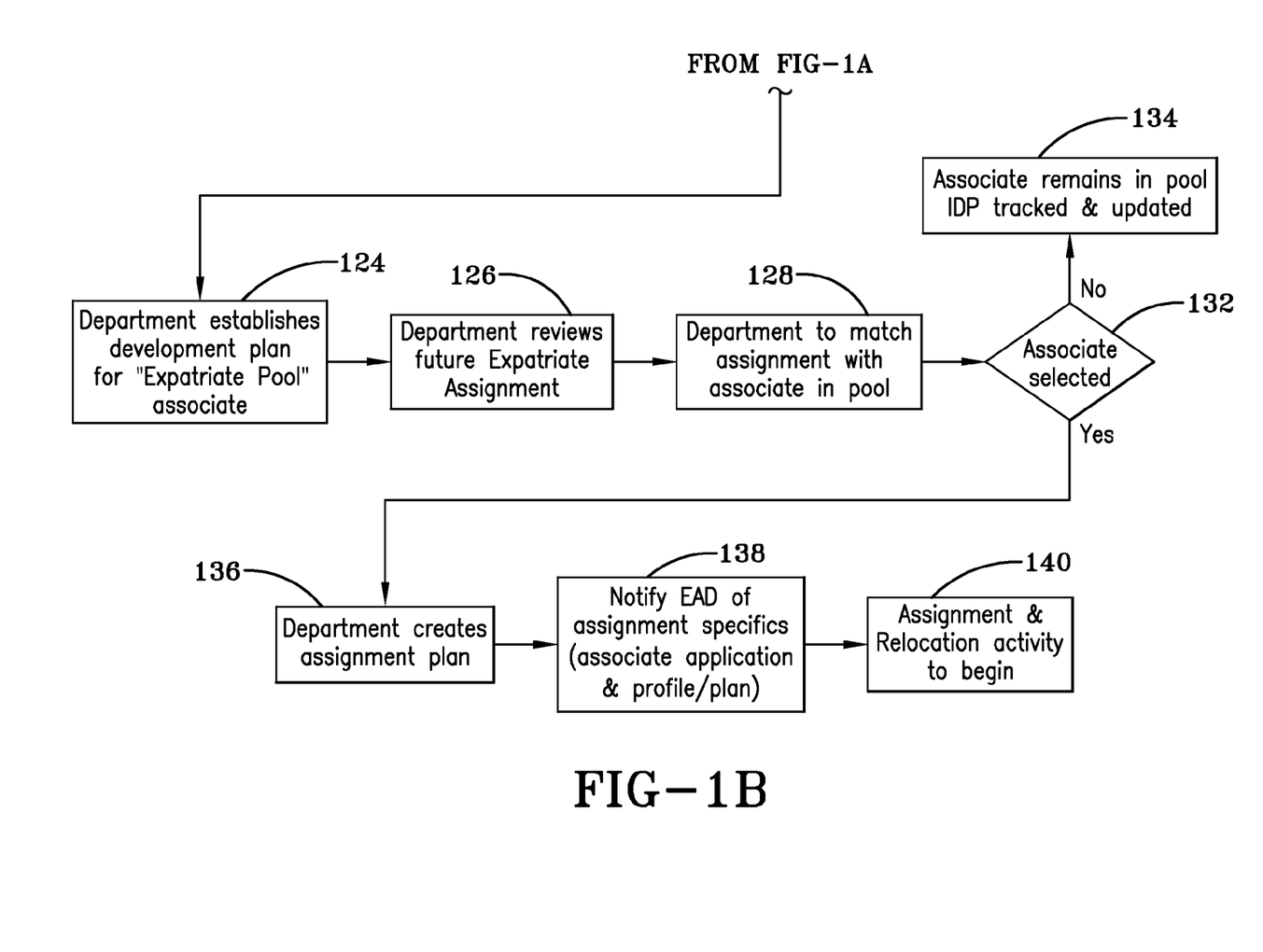

Referring to FIG. 1, a flowchart for an expatriate associate selection process according to an example embodiment of the present invention is shown. The process begins when a department of a multinational company identifies an expatriate assignment and one or more associates who may be eligible for the assignment 100. An associate of the department with the expatriate assignment contacts an Expatriate Administration Department (EAD) to start the selection process.

In the next step 102, each candidate for the expatriate assignment is provided with a Realistic Job Preview (RJP). For example, the candidate may be asked to view a RJP video. The RJP video is a self-assessment tool that assists the candidate in the self-selection process. It provides the candidate with detailed information about the organization and career opportunities associated with the expatriate assignment. It includes information related to job descriptions, career progression, development opportunities, and benefits. One of the primary benefits of the RJP tool is that it reduces the inconsistency between candidate's expectations of the assignment and what the assignment actually offers. Candidates are given a realistic view of the assignment so that they may make informed decisions.

Members of the candidate's family, if applicable, are also given an opportunity to view the RJP video. They are able to view and evaluate the same information that is provided to the candidate. As a result, the candidate and his or her family, if applicable, can reach a mutual decision based on the same information 104. The candidate may decide after viewing the video whether he or she wishes to proceed with the process. After viewing the RJP video, a candidate may decline to proceed with the process 106. Alternatively, the candidate may decide to proceed with the process and complete the remaining steps.

In the next step 108, the candidate completes a motivational fit assessment. The assessment may be based on a variety of job factors such as formal recognition, achievement, reward, position status, influencing others, task variety, travel, and recognition for expertise. The motivational fit assessment may comprise a job fit analysis to evaluate the candidate's fit with the motivational factors present in the target assignment. It may further comprise an organizational fit analysis to evaluate the candidate's satisfaction with the organization's values and method of operation. Finally, it may comprise a location fit analysis to evaluate the candidate's satisfaction with the geographic location of the job. A report is generated and a feedback session is held with the department manager 116 to discuss the report.

The motivational fit assessment may be completed using the Targeted Selection®: Motivational Fit System software package from Development Dimensions International, Inc. (DDI). The software package supplements a company's selection system by helping the company determine whether candidates will find a specific job assignment satisfying and the organizational culture desirable. The package may comprise questionnaires and inventories such as the following:

Job Fit Analysis Questionnaire: This questionnaire helps the organization's content experts rate the presence and prevalence of 26 job fit factors, such as coaching and independence, in the target assignment. The software generates a job fit profile.

Organization Fit Analysis Questionnaire: This questionnaire helps the organization's content experts measure the presence and prevalence of 28 organization fit factors, such as quality focus. The software generates an organization fit profile.

Ideal Job Inventory: This candidate questionnaire has 100 items and helps determine which factors a candidate would find motivating or demotivating in an ideal job. The software generates a candidate profile as well as tailored interview questions.

Ideal Organization Inventory: This candidate inventory allows a candidate to list the characteristics he or she would find appealing or unappealing in an organization. The software generates a candidate profile and tailored interview questions.

Comparison Reports: In addition to generating independent profiles and interview questions based on survey data, the system also provides candidate comparison reports. These reports look at the "gap" and "match" between what a job and organization offer and what a candidate is looking for in a job and organization.

Interview Questions: Questions are specifically written to explore the gaps and matches identified in the comparison reports. Interview questions are produced for inclusion in a Targeted Selection interview guide.

In the next step 110, a selection interview is conducted by the EAD and/or the administration of the department offering the assignment. The purpose of the selection interview is to assess the skills of the candidate in several areas that have been identified by job experts as critical to the successful performance while on an international assignment. An interview of the candidate based on the department specific expatriate competencies is conducted. Expatriate competencies may include communication, building strategic working relationships, stress tolerance, challenging spirit, decision making and problem solving, gaining commitment, planning and organizing, company philosophy, continuous learning, and technical expertise. The candidate's skills in these areas are evaluated to determine whether the candidate possesses the skills and abilities that are needed for an expatriate assignment. A report is generated and a feedback session is held with the department manager 116 to discuss the report.

In the next step 112, a technical assessment is administered by the EAD. The purpose of the technical assessment is to assess the proficiency of the candidate in several technical areas that have been identified by job experts as critical to successful performance while on an international assignment. Competencies related to technical aspects of the job may include such areas as computer knowledge, the company's manufacturing process, knowledge regarding the company's products, safety and ergonomics knowledge, quality knowledge, equipment and fixtures knowledge, and efficiency knowledge. The assessment tool used to evaluate technical competency may be created from a complete technical competency model that is developed as follows:

1. Determine appropriate level of competency definition: Create a model to define the desired outputs.
2. Identify technical competency framework: A competency is a major category within a technical domain area.
3. Identify draft knowledge areas within each domain: Identify the major division within each competency.
4. Build initial set of representative examples for each competency: Identify behavioral examples of how the competency is demonstrated on the job.
5. Gather input and share information: Draft competencies are reviewed, edited, and supplemented by the experts in the technical competency.
6. Validate the Model: Final competency model may be confirmed and validated to ensure accuracy and legal credibility.

The technical assessment may require the candidate to perform a self-assessment on the critical success factors using a tool created according to the technical competency model. The technical assessment may further comprise a second assessment administered by the department. Data is gathered by the EAD and summarized to determine the candidate's proficiencies. A report is generated and a feedback session is held with the department manager 116. This information may be used to create a technical development plan for the candidate. The plan addresses the development issues in preparation for a possible future assignment.

In the next step 114, a cultural assessment is completed. The purpose of the cultural assessment is to evaluate the candidate according to cultural aspects of the assignment. As part of this assessment, the candidate completes a self-assessment inventory. The Overseas Assignment Inventory (OAI) authored by Dr. Michael Tucker from Tucker International™ may be used to complete this step. The candidate completes the inventory by indicating his or her level of agreement with various statements related to personalities and cultures. The candidate's spouse, if applicable, may also be asked to complete the self-assessment inventory.

Data from the self-assessments are sent to a consultant to be analyzed. The consultant then provides a report based on the analysis. A feedback session is held with the department manager 116 to discuss the report and potential issues for the associate and trailing spouse, if applicable. A cultural development plan may be prepared for both individuals. The plan addresses the development issues in preparation for a possible future assignment.

As indicated in FIG. 1, the results of the motivational fit analysis, selection interview, the technical assessment, and the cultural assessment for each of the candidates are provided to the department manager 116. The results are compiled in a candidate selection summary report 118 that allows the department manager to easily compare the results across all candidates for all assessments. Following review of the candidate selection summary report, the department management determines whether each candidate should be added to an "expatriate pool" or group for further consideration 120. Candidates who are not selected for the expatriate group are informed and the selection process is complete 122.

In the next step 124, development plans for each candidate in the expatriate group are established by the department. Details from the various assessments form a development template for the associate. Next, the department reviews its future expatriate assignments to begin the process of selecting associates for specific assignments 126. The department matches each assignment with an associate in the expatriate group 128. The department then examines the complete list of associates in the expatriate group 132. Associates who are not selected for an expatriate assignment remain in the group and may be considered for future assignments 134. Associates who are selected for an expatriate assignment are given an assignment plan created by the department 136. The EAD is then notified of the assignment specifics including the associate's application and the associate's profile and plan 138 so that the assignment plan and relocation activities for the associate and associate's spouse may be started 140.

The following table provides details regarding the development of the EAD selection process.

TABLE 1

| Task | EAD/HRMS Responsibility & Time Needed | Department Responsibility & Time Needed |
|---|---|---|
| Department identified for selection program. | X | X |
| Identify non-technical scope of assignment (2-4 content experts from department) Confirm liaison critical success factors are applicable to assignment Rate & ranking liaison critical success factors Complete motivational fit survey with rate & ranking (e.g., questions related to 26 motivational facets); utilized for additional selection interview questions | X 4 hour interview | X 4 hour interview |
| Department provided a list of 10-15 questions for non-technical critical success factors. Department selects three questions for each critical success factor for interviewing candidate. | | X 1 hour |
| Create interview guide on non-technical critical success factors. | X 15 minutes | |

TABLE 1-continued

| Task | EAD/HRMS Responsibility & Time Needed | Department Responsibility & Time Needed |
|---|---|---|
| Identify technical scope of assignment (phone interviews with 2-4 content experts). | X 1 hour phone interview | X 1 hour phone interview |
| Identify technical critical success factors related to assignment and develop draft critical success factor model (meeting with subject matter experts & leaders of experts - approximately 4-6 associates). | X 2 hour meeting | X 2 hour meeting |
| Rate & rank complete critical success factor model to include both non-technical & technical. | | X 1 hour |
| Content development session to determine initial draft of technical test items and source data needed. Development Session (8 hour session) Development follow-up Review & revise assessment content | X 8 hour session | X 8 hour session |
| Draft Technical Assessment Pilot the test with experts Set scoring standards Finalized technical assessment rolled-out to department | X 4 hour session | X 4 hour session |
| Total hours: | 19.25 hours | 21 hours |

Figure 2:
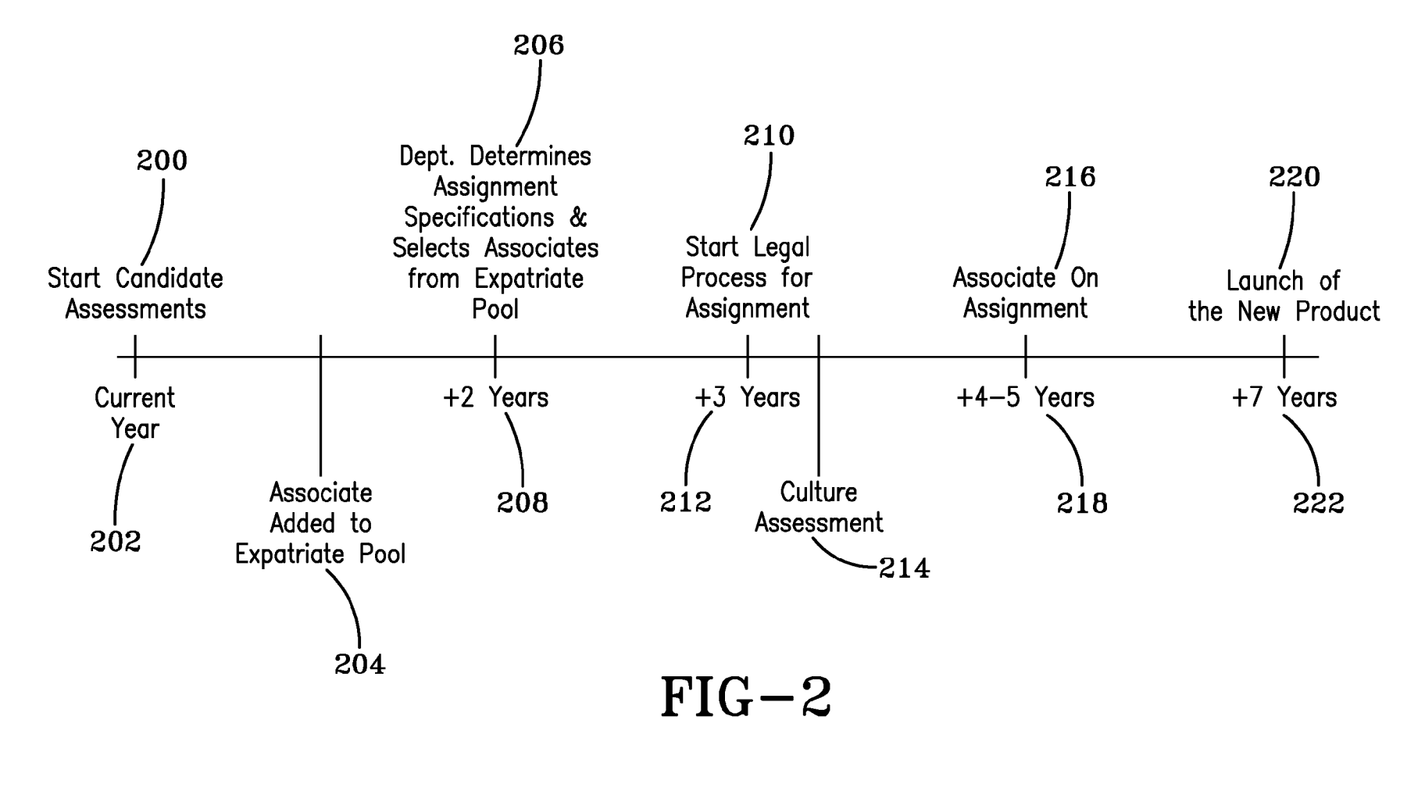
FIG. 2 is a timeline for implementing an expatriate associate selection process according to an example embodiment of the present invention.

Referring to FIG. 2, a timeline for implementing an expatriate associate selection process according to an example embodiment of the present invention is shown. In an example embodiment of the present invention, candidate selections start seven years prior to launch of the company's new product to which the expatriate assignments apply. Candidate assessments are started 200 in the current year 202. After the assessments are completed, associates who are strong candidates for expatriate assignments are added the expatriate group 204. Two years after the assessments are completed 208, the department determines its specifications for the assignments and selects associates from the expatriate group 206. Three years after the assessments are complete 212, legal arrangements for the assignments are made 210. At this point, preparations and training related to issues identified in the associates' cultural assessments are started 214. Four to five years after the assessments are completed 218, the associates are on their respective assignments. Upon their return to their home countries, they are repatriated. Seven years after the assessments are completed 222, the new product for which the expatriate assignments were completed is launched. Analyzing and addressing issues related to timing allows the company to create and maintain an expatriate group from which candidates may be selected even as the need for associates to fill expatriate assignments fluctuates.

The present invention provides a structured approach to selecting candidates for expatriate assignments. The expatriate associate selection process of the present invention results in benefits to a company's associates by standardizing the candidate selection process throughout the company and applying the same selection criteria consistently and fairly to all candidates. It also benefits the company by increasing the quality of candidates for assignments and helping departments gain a clear understanding of the technical and non-technical skills needed for international assignments. It provides diagnostic data that may be used to identify training and development needs of candidates. Finally, it provides a candidate group so that as the need for associates to complete international assignments changes, the company always has associates who are ready to fill the assignments.

Figure 3:
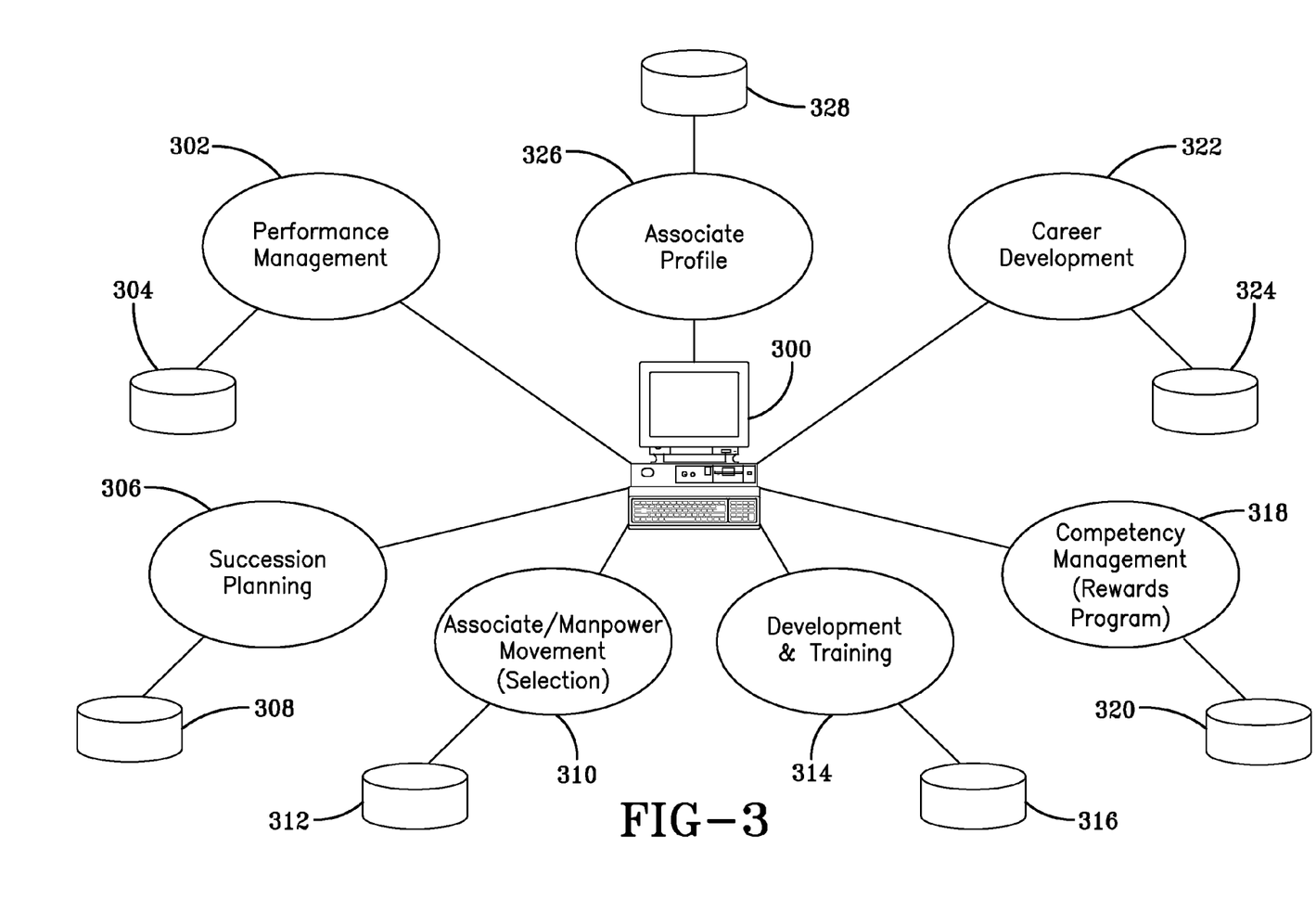
FIG. 3 is a functional diagram of HR subsystems according to an example embodiment.

Referring to FIG. 3, a functional diagram of HR subsystems that may be used in association with an expatriate selection system is shown. As shown in FIG. 3, HR subsystems may be implemented as a software module or component that provides features and functionality related to the identified area. A user at a workstation 300 may interact with each of the software modules or components to perform various HR tasks. The present invention may be implemented in a client-server application in which a client at a user workstation 300 allows a user to access one or more servers comprising HR subsystem software modules or components.

Each HR software module or component may access information from an associated database. Although each software module or component is shown with an associated database, the various software modules or components may be adapted to access information from a single database or from a lesser number of databases in which several software modules or components are adapted to access information from a single database which creates faster, more comprehensive data retrieval features and functionality as shown in Table 2. The associated databases may provide input to HR subsystem software modules or store output from HR subsystem software modules as shown in Table 2.

HR subsystem software modules provide input to other HR subsystem software modules or store output from an HR subsystem software module as shown in Table 2.

TABLE 3

| HR Subsystem Software Components | |
|---|---|
| Career Development Database 324 | Data for management and administration of tools for career development subsystem including live, online versions of associates career plans and interests, and resources for development |
| Performance Management 302 | Management and administration of tools for performance management subsystem. Associate rating information is considered. |
| Performance Management Database 304 | Data for management and administration of tools for performance management subsystem including: performance histories, performance trends and distributions, results of assessments for employees or associates, job family checksheets, and critical success factor check sheets |
| Succession Planning 306 | Management and administration of tools for succession planning subsystem, and linking successors to positions. Associate rating information, associate career development plans, associate proficiencies on critical success factors, associate work experience, associate education, associate career interests, and past development activities are considered. |
| Succession Planning Database 308 | Data for management and administration of tools for succession planning subsystem including results of BARS |
| Development & Training 314 | Management and administration of tools for development and training subsystem. Associate development activity is considered. |
| Development & Training Database 316 | Data for management and administration of tools for development and training subsystem including results of various assessments, development plans, repository of development options. |
| Competency Management (Rewards Programs) 318 | Management and administration of tools for rewards programs subsystem. Associate critical success factors and critical success factors for the position are considered. |
| Competency Management (Rewards Programs) Database 320 | Data for management and administration of tools for rewards programs subsystem including methods for providing and tracking rewards for individuals. |
| Associate Profile 326 | Management and administration of tools for associate profiles. |

Each associate profile may include information regarding an associate's education, prior work experience, prior work experience within the company, current interests in addition to information regarding compensation, benefits, dependents, and related information.

While example embodiments of the invention have been illustrated and described, various modifications and combinations can be made without departing from the spirit and scope of the invention. For example, the types of assessments and the order in which they are completed may be modified and still fall within the scope of the present invention. Modifications, combinations, and equivalents to the system and method of the present invention are intended to be covered and claimed.

What is claimed is:

1. A method for selecting associates for expatriate assignments comprising:
   (a) establishing a date for a new product launch;
   (b) determining a first period of years in advance of said date to complete an expatriate associate selection process for expatriate assignments applicable to said new product launch;
   (c) within said first period of years:
      (1) identifying a plurality of associates eligible for said expatriate assignments;
      (2) providing each of said plurality of associates with preview information relevant to a plurality of expatriate assignments, said preview information comprising organization, job description, and career progression information related to said expatriate assignments;
      (3) receiving identifying information for a first set of candidates from said plurality of associates who have:
         (A) reviewed said preview information regarding said plurality of expatriate assignments; and
         (B) agreed to be considered for said expatriate assignments;
      (4) administering a plurality of assessments to said first set of candidates;
      (5) entering in a computer assessment data for said first set of candidates completing said plurality of assessments;
      (6) preparing at said computer a candidate selection summary report for comparing assessment data across all candidates in said first set of candidates;
      (7) creating an Expatriate Pool of candidates by comparing said assessment data to select from said first set of candidates a subset of candidates to add to said Expatriate Pool of candidates;
      (8) identifying at said computer specifications for each of a plurality of expatriate assignments for said new product launch, wherein said identifying occurs a second period of years after said plurality of assessments are completed, said second period of years being a subset of said first period of years;
      (9) after identifying said assignments and after creating said Expatriate Pool of candidates, creating at said computer a group of expatriate associates for said expatriate assignments by matching assignments to candidates from said Expatriate Pool of candidates;
      (10) establishing at said computer an assignment plan for each associate in said group of expatriate associates, said assignment plan comprising activities to assist in preparing said associates for said expatriate assignments;

(11) arranging for said group of expatriate associates to complete said expatriate assignments outside said associates' home countries;

(12) arranging for said group of expatriate associates to return said associates' home countries;

(d) after said first period of years and completion of said expatriate assignments and by said date, launching said new product.

2. The method of claim 1 wherein providing each of said plurality of candidates with preview information regarding said expatriate assignments comprises providing each of said candidates with a realistic job preview video.

3. The method of claim 1 wherein receiving identifying information for a first set of candidates from said plurality of associates comprises determining which associates have decided to not proceed.

4. The method of claim 1 wherein said assessments comprise motivational, behavioral, cultural, and technical assessments.

5. The method of claim 4 wherein establishing an assignment plan for each associate in said group of expatriate associates comprises establishing assignment plans according to gaps identified from said motivational, behavioral, cultural, and technical assessments.

6. The method of claim 1 wherein at least one of said assessments is a self-assessment.

7. A method for identifying a group of associates for expatriate assignments comprising:

(a) establishing a date for a new product launch;

(b) determining a first period of years in advance of said date to complete an expatriate associate selection process for expatriate assignments applicable to said new product launch;

(c) within said first period of years:

(1) identifying a first set of candidates who may be eligible for expatriate assignments;

(2) administering a plurality of assessments to said first set of candidates;

(3) entering in a computer assessment data for said plurality of assessments administered to said first set of candidates;

(4) preparing at said computer a candidate selection summary report for comparing assessment data across all candidates in said first set of candidates;

(5) creating an Expatriate Pool of candidates by comparing said assessment data to select from said first set of candidates a subset of candidates to add to said Expatriate Pool of candidates;

(6) identifying at said computer specifications for each of a plurality of expatriate assignments for said new product launch, wherein said identifying occurs a second period of years after said plurality of assessments are completed, said second period of years being a subset of said first period of years;

(7) after identifying said assignments and after creating said Expatriate Pool of candidates, creating at said computer a group of expatriate associates for said expatriate assignments by matching assignments to candidates from said Expatriate Pool;

(8) identifying a second set of candidates who may be eligible for expatriate assignments;

(9) administering a plurality of assessments to said second set of candidates;

(10) entering in said computer assessment data for said plurality of assessments to identify additional expatriate candidates from said second set of candidates for said Expatriate Pool;

(11) matching assignments to said additional expatriate candidates in said Expatriate Pool;

(12) arranging for said group of expatriate associates to complete said expatriate assignments outside said associates' home countries;

(13) arranging for said group of expatriate associates' to return said associates' home countries;

(d) after said first period of years and completion of said expatriate assignments and by said date, launching said new product.

8. The method of claim 7 further comprising creating an assignment plan for each of said associates selected for said plurality of expatriate assignments.

9. The method of claim 7 wherein said plurality of assessments comprise motivational, behavioral, cultural, and technical assessments.

10. The method of claim 7 wherein at least one of said plurality of assessments is a self-assessment.

11. The method of claim 8 wherein establishing assignment plans for each associate in said group of expatriate associates comprises establishing assignment plans for each associate according to gaps identified from said assessments.

12. The method of claim 7 wherein identifying a first or second set of candidates comprises:

providing each of a plurality of associates with preview information regarding a plurality of expatriate assignments; and determining which associates have reviewed said preview information and withdrawn voluntarily from further consideration.

* * * * *